(12) United States Patent
Ranade et al.

(10) Patent No.: US 11,347,443 B2
(45) Date of Patent: May 31, 2022

(54) MULTI-TIER STORAGE USING MULTIPLE FILE SETS

(75) Inventors: Dilip Madhusudan Ranade, Pune (IN); Niranjan Pendharkar, Pune (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 1416 days.

(21) Appl. No.: 13/447,028

(22) Filed: Apr. 13, 2012

(65) Prior Publication Data

US 2013/0275653 A1  Oct. 17, 2013

(51) Int. Cl.
| | |
|---|---|
| *G06F 16/00* | (2019.01) |
| *G06F 3/06* | (2006.01) |
| *G06F 16/185* | (2019.01) |
| *G06F 16/22* | (2019.01) |
| *G06F 16/17* | (2019.01) |
| *G06F 16/13* | (2019.01) |

(Continued)

(52) U.S. Cl.
CPC .......... *G06F 3/067* (2013.01); *G06F 3/0605* (2013.01); *G06F 3/0649* (2013.01); *G06F 12/023* (2013.01); *G06F 16/13* (2019.01); *G06F 16/174* (2019.01); *G06F 16/178* (2019.01); *G06F 16/1734* (2019.01); *G06F 16/185* (2019.01); *G06F 16/2282* (2019.01)

(58) Field of Classification Search
CPC ...... G06F 3/067; G06F 16/185; G06F 3/0605; G06F 3/0649; G06F 16/1734; G06F 16/184; G06F 16/174; G06F 16/148; G06F 16/10; G06F 16/2282; G06F 16/13; G06F 12/023; G06F 12/0804; G06F 12/08123; G06F 12/127; G06F 12/0246; G06F 11/1435; G06F 11/1451; G06F 11/1464; G06F 16/122; G06F 16/128; G06F 16/178; G06F 3/0644; H04L 67/1097

See application file for complete search history.

(56) References Cited

U.S. PATENT DOCUMENTS

| | | | | |
|---|---|---|---|---|
| 7,849,282 | B2 * | 12/2010 | Nonaka | G06F 3/0649 711/165 |
| 8,443,149 | B2 * | 5/2013 | Wang | G06F 12/127 711/133 |

(Continued)

FOREIGN PATENT DOCUMENTS

WO  WO 2009/019128 A1 *  2/2009

OTHER PUBLICATIONS

Martin V. Jørgensen et al., "FB-Tree: A B+-Tree for Flash-Based SSDs", IDEAS11, , Lisbon [Portugal], Sep. 21-23, 2011, pp. 34-42.*

*Primary Examiner* — Srirama Channavajjala
(74) *Attorney, Agent, or Firm* — Patent Law Works LLP

(57) ABSTRACT

Storage locations in a first tier of a multi-tier storage system are allocated to a first set of data structures (e.g., inodes) in a first file set. A file that is stored in the first tier is associated with a first data structure of the first set. In response to determining that data in the file should be moved to a second tier of the multi-tier storage system, the file is associated with a second data structure in a second file set. The second data structure is allocated a storage location in the second tier. Consequently, two data structures are associated with the file. The data is copied from the first tier to the storage location in the second tier, and can be subsequently accessed using the second data structure.

18 Claims, 7 Drawing Sheets

(51) Int. Cl.
　　　*G06F 16/178*　　(2019.01)
　　　*G06F 12/02*　　 (2006.01)
　　　*G06F 16/174*　　(2019.01)

(56) References Cited

U.S. PATENT DOCUMENTS

| | | | | |
|---|---|---|---|---|
| 8,843,459 | B1* | 9/2014 | Aston | G06F 16/13 |
| | | | | 707/694 |
| 9,043,530 | B1* | 5/2015 | Sundaram | G06F 3/068 |
| | | | | 711/100 |
| 2006/0026364 | A1* | 2/2006 | Haswell | G06F 12/0862 |
| | | | | 711/137 |
| 2007/0250552 | A1* | 10/2007 | Lango | H04L 67/2842 |
| 2009/0043978 | A1* | 2/2009 | Sawdon | G06F 3/065 |
| | | | | 711/162 |
| 2009/0089524 | A1* | 4/2009 | Fujihara | G06F 3/0635 |
| | | | | 711/162 |
| 2010/0281230 | A1* | 11/2010 | Rabii | G06F 12/121 |
| | | | | 711/165 |
| 2010/0306288 | A1* | 12/2010 | Stein | G06F 17/30312 |
| | | | | 707/609 |
| 2011/0016085 | A1* | 1/2011 | Kuo | G06F 16/184 |
| | | | | 707/615 |
| 2012/0102261 | A1* | 4/2012 | Burger et al. | 711/103 |
| 2012/0198197 | A1* | 8/2012 | Gladwin | G06F 16/13 |
| | | | | 711/170 |
| 2012/0260055 | A1* | 10/2012 | Murase | G06F 3/0665 |
| | | | | 711/165 |
| 2013/0166839 | A1* | 6/2013 | Burton | G06F 3/0643 |
| | | | | 711/114 |

* cited by examiner

MULTI-TIER STORAGE USING MULTIPLE FILE SETS

BACKGROUND

Conventional storage management and file relocation solutions use multi-tier storage systems to balance performance and costs. At higher tiers, performance is better but the cost is higher, while at lower tiers the cost is reduced but so is performance.

For example, unimportant or out-of-date files can be moved to less expensive storage devices without changing the way users or applications access those files. Similarly, policies can be created that will move files to higher performance storage devices based on, for example, input/output (I/O) "temperature" (e.g., frequency of access) or service requirements (e.g., service level agreements).

With dynamic storage tiering (DST), files can be dynamically moved without having to take the application offline and without changing the way an application or database accesses the information. Consequently, the move is usually transparent to the users and applications that own the files. Furthermore, as data is moved between the different storage tiers, policies can be centrally managed and dynamic, and can support a heterogeneous server and storage infrastructure that does not require modifications to application, database, or backup/recovery policies.

The amount of data being stored continues to increase at a high rate. Also, government and industry regulations may require that data be retained for longer periods of time. However, as noted above, only some of the data may be accessed frequently, and it is not cost-effective to store all data in high-end storage (e.g., higher tiers).

SUMMARY

Current policies rely on analysis of file change logs to identify frequently accessed ("hot") files that can be moved to a higher tier, but there is no efficient mechanism for identifying infrequently accessed ("cold") files that can be moved to a lower tier.

According to embodiments of the present disclosure, a new file set (a second file set) is created in addition to an existing file set (a first file set). Initially, files have "inodes" only from the first file set. As used herein, an inode refers to a data structure that contains information about a file and, in essence, maps the file to memory block addresses. While the following discussion is presented using inodes as an example, embodiments according to the present disclosure are not so limited.

Inodes in the first file set are allocated extents (blocks of data) only from a first tier in a multi-tier storage system. Similarly, inodes in the second file set are allocated storage only from a second tier in the multi-tier storage system. In effect, blocks/extents from different tiers are allocated exclusively to respective sets of inodes, where each set of inodes is associated with a respective file system. In this example, although two tiers, file sets, and sets of inodes are discussed, the present invention is not so limited.

Note that, unless otherwise noted, terms such as "first" and "second" are simply used as modifiers to distinguish one element from a similar type of element. "First" and "second" do not necessarily imply any type of ranking or order. In the discussion herein, for example, "first tier" may be read as being a higher tier relative to "second tier." Similarly, "first tier" may be read as being a lower tier relative to "second tier." Thus, if "first tier" is read as the higher tier, then "second tier" is read as the lower tier, and vice versa.

In one embodiment, state information is associated with each inode. The state information may be stored in the inode itself or it may be associated with the file in some manner. The state information may include one or more state variables. A state variable may be, for example, a metric that can be used to identify whether a file is a candidate to be moved from one tier to another (and hence from one file set to another). The metric may be, for example, I/O temperature. Alternatively, a state variable may be the type of file or the owner of the file. Also, a state variable may be applied to an entire inode (e.g., an entire file), or it may be applied to parts of a file (e.g., per block, per 256 KB region, per extent, etc.). In other words, for example, one part of a file may have one I/O temperature, and another part of the file may have a different I/O temperature. Using the state information, a policy can be implemented to decide if a file is to be copied or moved from one tier to another. A decision to copy or move a file can be made based on a single state variable (e.g., I/O temperature) or based on a combination of state variables (e.g., move a text file only if its I/O temperature is low), depending on the policy in place.

A first inode from the first file set is associated with a file in the first tier. In one embodiment, when that file is accessed via the first file set (e.g., via the first inode), the state information associated with (e.g., in) the first inode is checked to determine whether the file ought to be moved to the second tier. For example, if the first tier is the lower ranked tier and the second tier is the higher ranked tier, then the state information is used to determine whether the file should be moved from the lower ranked tier to the higher ranked tier. Similarly, if the first tier is the higher ranked tier and the second tier is the lower ranked tier, then the state information is used to determine whether the file should be moved from the higher ranked tier to the lower ranked tier.

Continuing with an example in which the file is to be moved from the first tier to the second tier, a corresponding new (second) inode in the second file set is allocated, either immediately or asynchronously. In one embodiment, the second inode has the same inode number as the first inode, which indirectly links the two inodes. In another embodiment, the first and second inodes have different inode numbers, in which case the first inode includes a reference to the second inode and vice versa. Extents from the second tier are allocated to the second inode, and data is copied from the first tier to the second tier. Then, the extents allocated to the first inode (in the first tier) may be deleted. Also, in an embodiment in which the first and second inode numbers are the same, a flag in the first inode is set to indicate the presence of the corresponding second inode. In an alternate embodiment, as mentioned above, the first inode is modified to include a reference to the second inode (e.g., the first inode includes the second inode number). If a file is to be moved from the second tier to the first tier, then the process just described is performed, but essentially in reverse.

In one embodiment, in response to a request to access a file (e.g., a read or write request), first a check is performed in order to determine whether there is an inode for the file in the file set for the highest ranking tier in the multi-tier storage system. If an inode for the file exists in the file set for the highest ranking tier, then the access request is serviced from that tier. If an inode does not exist in the file set for the highest ranking tier, then a similar check is made for an inode for the file system for the next highest ranking tier, and so on through the hierarchy of file sets/tiers until an inode for the file is found. That inode can then be used to access the file data from the tier on which the data is stored.

As noted above, the state information for a file can be checked when the file is accessed. Also, the state information for the file, and in fact for all files in each file set, can be checked on a periodic basis to identify files that are candidates for movement from one tier to another tier. In an embodiment in which the state information is included in each inode, the check can be efficiently performed by querying the state information for (e.g., in) each inode in each file set to identify cold files and hot files. Thus, embodiments according to the present disclosure provide an efficient mechanism for identifying infrequently accessed files that can be moved to a lower tier.

In addition, the state information for files in a tier can be checked if the available space in a tier falls below a threshold value. For example, if a higher ranking tier (which generally has less capacity then the lower ranking tiers) begins to get full, it may be necessary to evict (move) files or blocks from the higher tier to a lower tier, in order to make space in the higher tier for new (e.g., hot) data. By having a separate set of inodes for the higher tier, it is more efficient to scan just that set of inodes to determine which files or blocks can be evicted.

Furthermore, as described above, embodiments according to the present disclosure provide an efficient mechanism for accomplishing the movement of files and for servicing accesses to those files after they have been moved. These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
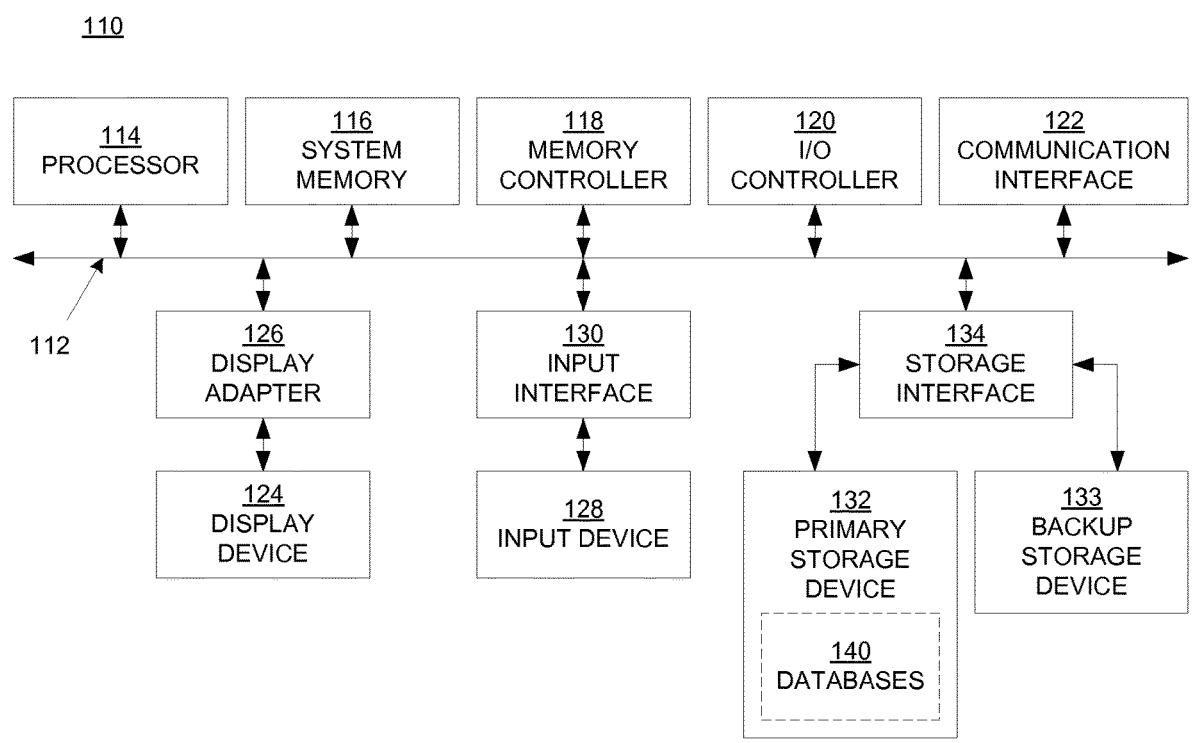
FIG. 1 is a block diagram of an example of a computer system upon which embodiments of the present disclosure can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "allocating," "associating," "moving," "copying," "setting," "including," "checking," "accessing," "determining," "identifying," "caching," "querying," "reading," "writing," or the like, refer to actions and processes (e.g., flowcharts 400, 800, and 1000 of FIGS. 4, 8, and 10, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device.

Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
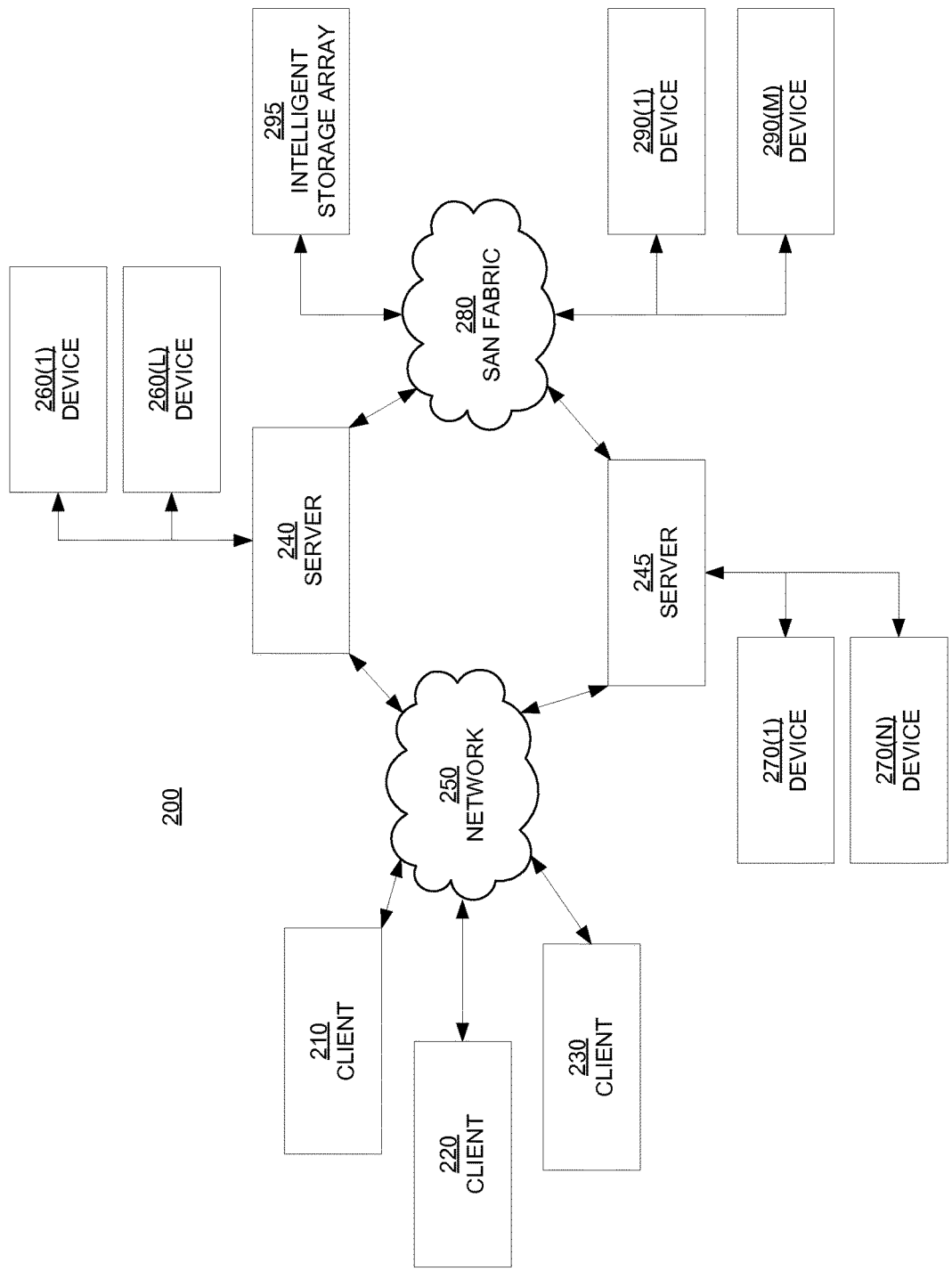
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
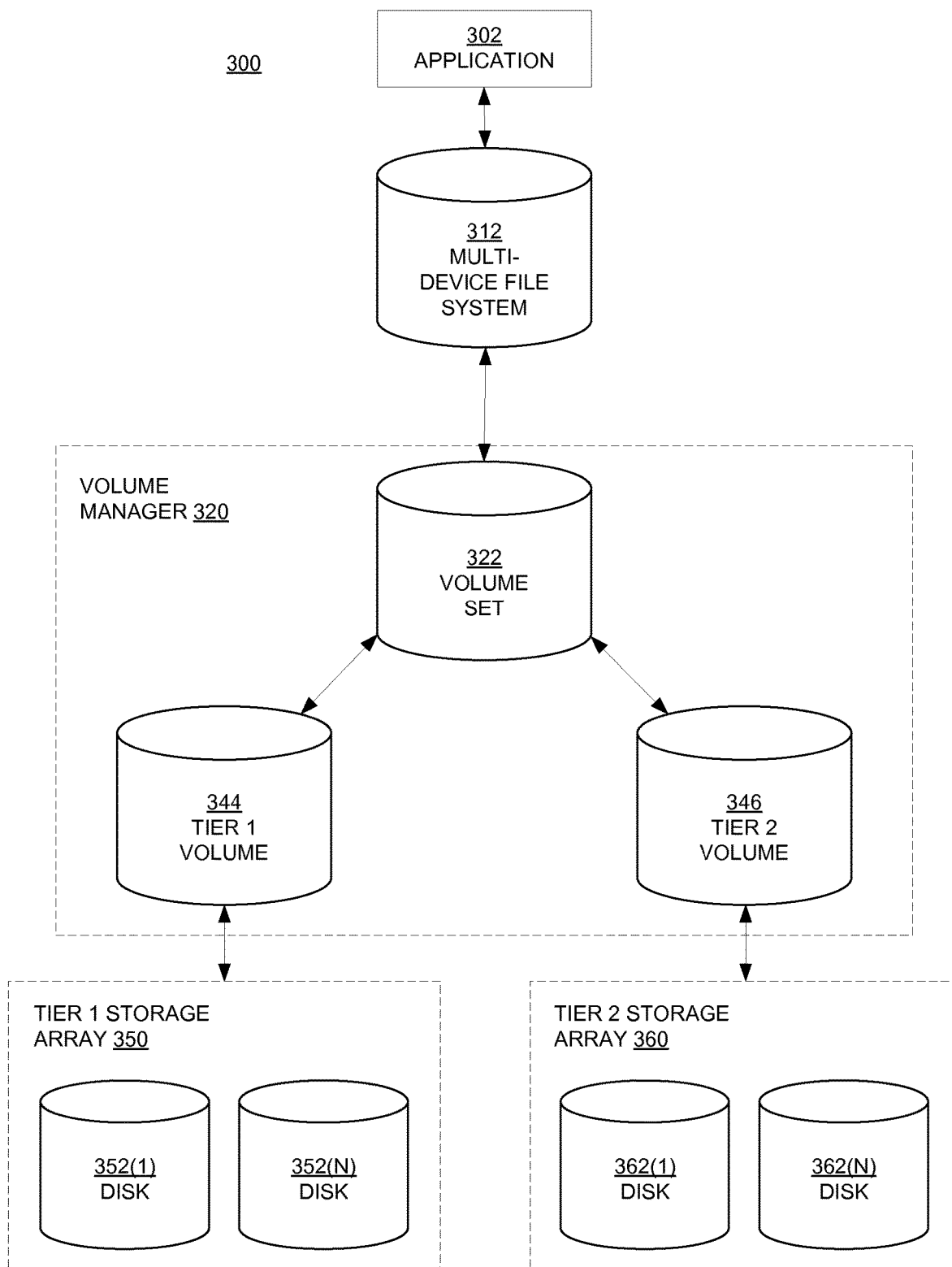
FIG. 3 is a block diagram of an example of a multi-tier storage system upon which embodiments of the present disclosure may be implemented.

FIG. 3 is a block diagram of an example of a multi-tier storage system 300 upon which embodiments of the present disclosure may be implemented. System 300 may include an application 302 in communication with a multi-device file system 312 for multi-tier storage, which may also be referred to as dynamic storage. Multi-tier storage generally refers to the use of virtual or physical storage devices with different characteristics to provide differentiated storage for computing systems. Each tier may be ranked based on those characteristics. For example, storage devices in a multi-device file system may have different I/O performance, availability, and/or cost characteristics and may be ranked accordingly. In other words, higher ranked tiers may result in higher performance at a higher cost/price, and lower ranked tiers may result in lower performance at a reduced cost/price. Storage system 300 can also support multi-volume file systems through multi-device file system 312 and can provide automatic policy-based placement of portions (e.g., extents or blocks) of files.

In the FIG. 3 embodiment, volume manager 320 may implement software-based virtualization for facilitating multi-tier storage in the form of virtual volumes configured from multiple hardware devices. Volume set 322 may be divided into a tier 1 volume 344 and a tier 2 volume 346. For example, tier 1 volume 344 may include tier 1 storage array 350 (e.g., disk 352(1) through disk 352(N)). Similarly, tier 2 volume 346 may include a tier 2 storage array 360 (e.g., disk 362(1) through disk 362 (N)). Although only two tiers are shown and described below, the present invention is not so limited.

Tier 1 volume 344 and/or tier 2 volume 346 may be configured from enterprise disk array LUNs (logical unit number units), mid-range disk array LUNs, and/or disks connected directly to their host systems. Tier 1 volume 344 and/or tier 2 volume 346 may also represent more complex configurations, such as mirrored volumes configured from RAID (Redundant Array of Independent Disks)-5 LUNs presented by two disk arrays.

One of the tiers (e.g., tier 1 storage array 350) may be ranked as the lower of the two tiers and the other of the tiers (e.g., tier 2 storage array 360) may be ranked as the higher of the two tiers. In one such embodiment, the lower-ranked tier is implemented as a hard disk device (HDD), and the higher-ranked tier is implemented as a solid state device (SSD).

Figure 4:
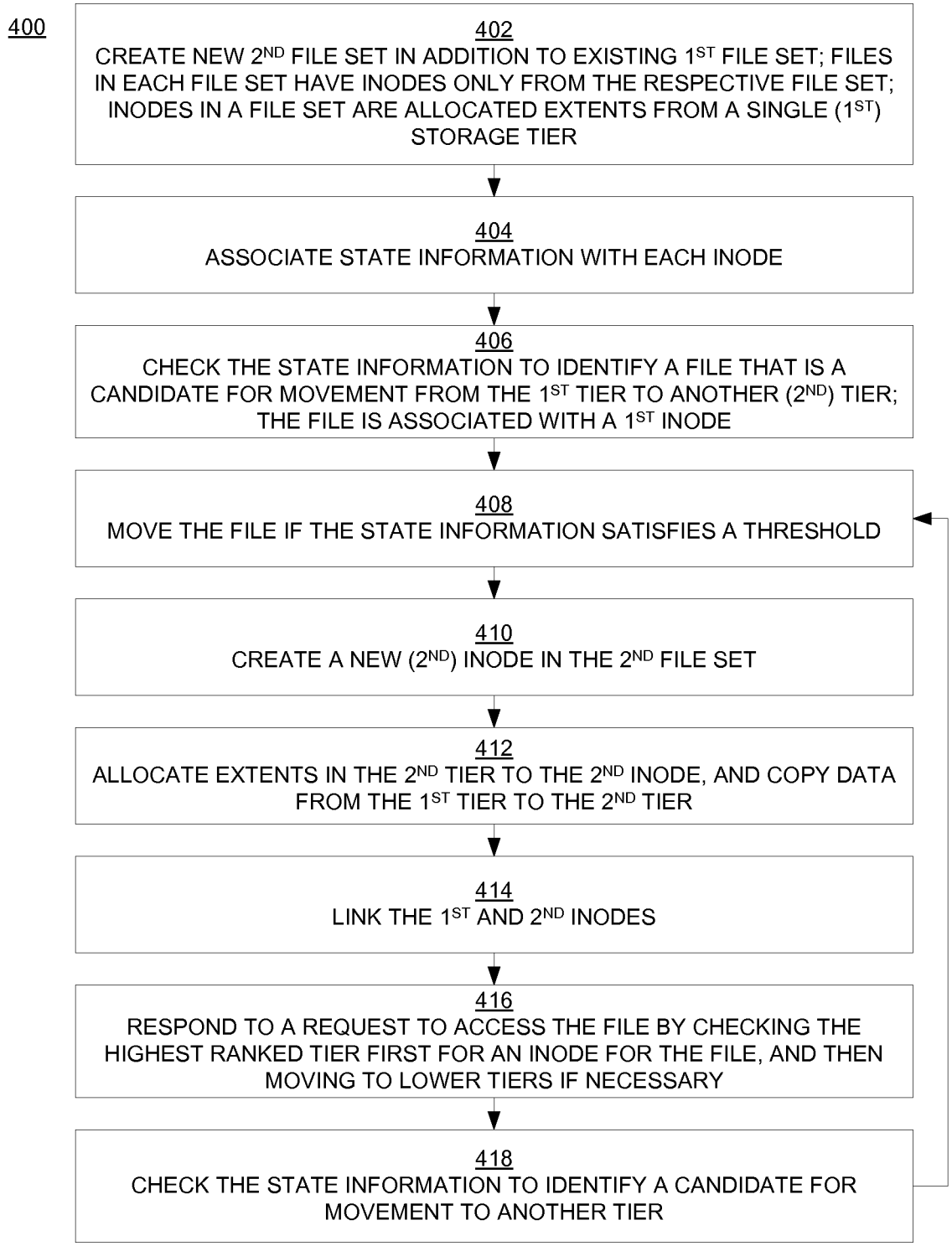
FIG. 4 is a flowchart of an example of a computer-implemented process for managing files in a multi-tier storage system according to embodiments of the disclosure.

FIG. 4 is a flowchart 400 of an example of a computer-implemented process for managing files in a multi-tier storage system according to embodiments of the disclosure. Flowchart 400 can be implemented as computer-executable instructions residing on some form of computer-readable storage medium (e.g., using computing system 110 of FIG. 1). In one embodiment, the process of flowchart 400 is implemented in multi-device file system 312 (FIG. 3), at the file abstraction layer.

In general, as used herein, an inode refers to a data structure that contains information about a file and, in essence, maps the file to memory block addresses. By way of example, the examples of FIGS. 4, 5, 6, and 7 are presented using the term "inode," but it is understood that embodiments of the disclosure are not limited to data structures known as inodes. An inode is generally associated with a Unix file system, and other file systems may utilize data structures similar to or equivalent to inodes but known by a different name.

Figure 5:
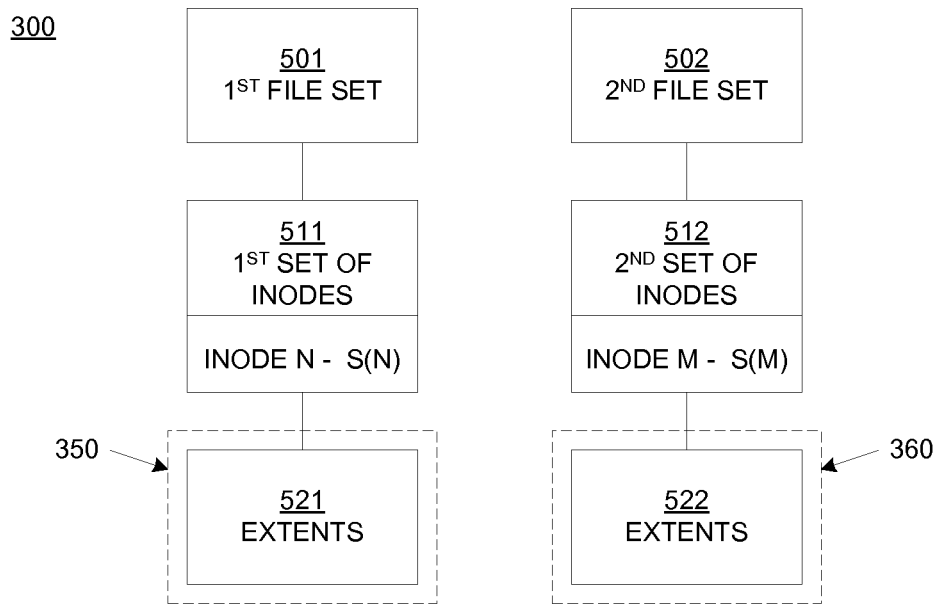
FIG. 5 illustrates multi-tier storage using multiple file sets according to embodiments of the disclosure.

In block 402 of FIG. 4, with reference also to FIG. 5, a new file set (second file set 502) is created in addition to an existing file set (first file set 501). Each file set is identified by a respective file set identifier. Files in first file set 501 have inodes 511 only from the first file set. Inodes 511 in first file set 501 are allocated extents (blocks of data) 521 only from one tier (e.g., tier 1 storage array 350) in multi-tier storage system 300. Similarly, files in second file set 502 have inodes 512 only from the second file set, and inodes 512 in second file set 502 are allocated storage (extents 522) only from another tier (e.g., tier 2 storage array 360) in multi-tier storage system 300. In effect, blocks/extents from different tiers are allocated exclusively to respective sets of inodes, where each set of inodes is associated with a respective file system. File set 1 and file set 2 each have their own set of inodes stored in a respective inode list file or table (not shown).

In the example of FIGS. 4 and 5, each inode is identified by an inode number. Each inode includes a number of fields or attributes. Information stored in an inode includes, but is not necessarily limited to, the type of file, permissions associated with the file, the link count, the file's size, and address(es) that point to data block(s) (extents) that store the actual contents of the file (that is, the file data itself). An extent is usually described in terms of an offset, a starting block, and the number of contiguous blocks in the extent. As noted above, a data structure other than an inode but providing the same functionality as an inode, and perhaps including much the same information as an inode, may be used, depending on the type of file system.

In block 404 of FIG. 4, with reference also to FIG. 5, in one embodiment, state information S is associated with each inode. The state information may be stored in the inode itself or it may be associated with (linked to) the inode in some manner. In general, the state information includes one or more state variables that can be used to identify whether a file is a candidate to be moved from one tier to another (and hence from one file set to another). The state variable may be a metric (e.g., a numerical value) such as, for example, I/O temperature, a time-based value indicating when the inode or file was last accessed and/or modified, and/or a version number for the inode or file. Alternatively, a state variable may be information that identifies the type of file or the owner of the file. Also, a state variable may be applied to an entire inode (e.g., an entire file), or it may be applied to parts of a file (e.g., per block, per 256 KB region, per extent, etc.). In other words, for example, one part of a file may have one I/O temperature, and another part of the file may have a different I/O temperature. Using the state information, a policy can be implemented to decide if a file is to be copied or moved from one tier to another. A decision to copy or move a file can be made based on a single state variable (e.g., move a file if its I/O temperature is high or increasing relative to a threshold value), or the decision can be based on a combination of state variables (e.g., move a text file only if its I/O temperature is low), depending on the policy in place.

Figure 6:
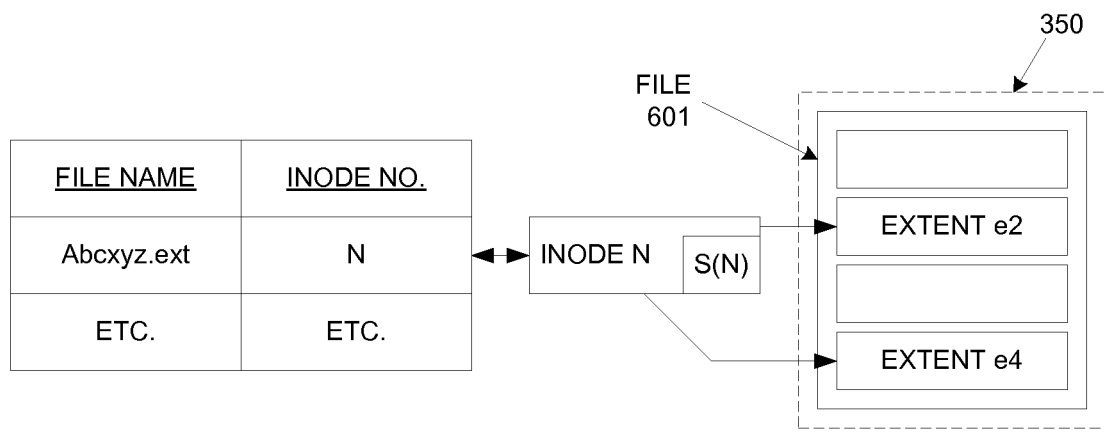
FIG. 6 illustrates a file stored in a tier of multi-tier storage system according to embodiments of the disclosure.

With reference also to FIGS. 5 and 6, a first inode N from first file set 501 is associated with a file 601 in a tier (e.g., tier 1 storage array 350). In the example of FIG. 6, file 601 includes extents e2 and e4. In block 406 of FIG. 4, in one embodiment, when file 601 is accessed via first file set 501 (e.g., via first inode N), the state information S(N) associated with first inode N is checked to determine whether file 601 ought to be moved to another tier (e.g., to tier 2 storage array 360). For example, if tier 1 storage array 350 is the lower ranked tier and tier 2 storage array 360 is the higher ranked tier, then state information S(N) is used to determine whether file 601 should be moved from the lower ranked tier to the higher ranked tier. Similarly, if tier 1 storage array 350 is the higher ranked tier and tier 2 storage array 360 is the lower ranked tier, then state information S(N) is used to determine whether file 601 should be moved from the higher ranked tier to the lower ranked tier.

In block 408, state information S(N) is used to determine whether file 601 should be moved from its current tier to another tier, depending on the policy in place. For example, if the file's I/O temperature is less than a threshold value, then file 601 is not moved; otherwise, a decision is made to move file 601 from tier 1 storage array 350 to tier 2 storage array 360. As noted above, a decision to copy or move a file can be made based on a single state variable (e.g., I/O temperature) or based on a combination of state variables (e.g., move a text file only if its I/O temperature is low), depending on the policy in place.

Figure 7:
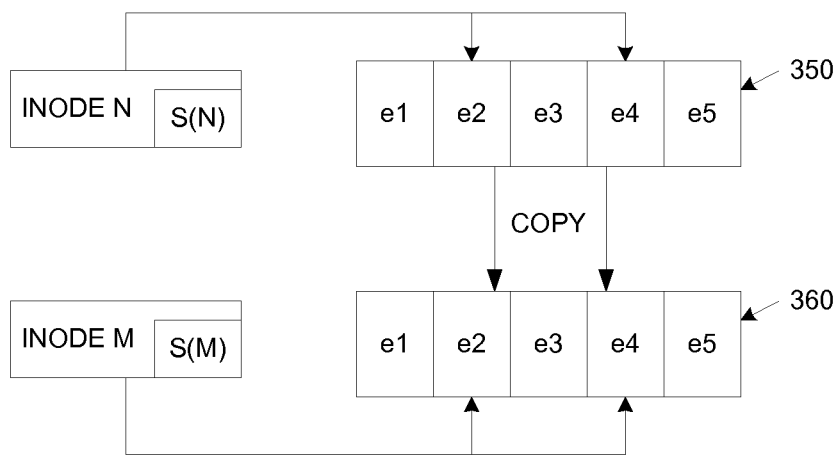
FIG. 7 illustrates multi-tier storage using multiple inodes according to embodiments of the disclosure.

In block 410 of FIG. 4, with reference also to FIGS. 5 and 7, a corresponding new (second) inode M in second file set 502 is created, either immediately or asynchronously. In one embodiment, second inode M has the same inode number as first inode N (that is M=N), thereby indirectly linking the two inodes. In another embodiment, first inode N and second inode M have different inode numbers (that is, M≠N), in which case first inode N includes a reference to second inode M, and vice versa. For example, inode N can include a new field that names inode M, and inode M can include a new field that names inode N.

In block 412, extents from tier 2 storage array 360 are allocated to second inode M, and data is copied from tier 1 storage array 350 to tier 2 storage array 360. In one embodiment, as illustrated in the example of FIG. 7, the extents in tier 2 storage array 360 have the same descriptor (e.g., offsets, etc.) as they did in tier 1 storage array 350, and thus their locations in tier 2 storage array 360 correspond to the same locations in tier 1 storage array 350. In one embodiment, the extents allocated to first inode N (e.g., extents e2 and e4 in tier 1 storage array 350) are freed after they have been copied to tier 2 storage array 360. However, a potential overhead savings may be realized by not freeing those extents.

In block 414, in an embodiment in which N and M are the same, a flag in first inode N is set to indicate the presence of the corresponding second inode M. In an alternate embodiment, first inode N is modified to include a reference to second inode M (e.g., the first inode includes the second inode number). In general, the inodes N and M are linked in some way, either directly or indirectly.

If a file is to be moved from tier 2 storage array 360 to tier 1 storage array 350, then the process just described is performed, but essentially in reverse.

In block 416, in one embodiment, a request to access a file (e.g., a read or write request) is responded to by first checking whether there is an inode for the file in the file set for the highest ranking tier in the multi-tier storage system. In other words, if tier 2 storage array 360 is the highest ranking tier, the inode list file or table for file set 2 is checked to see if an inode (e.g., inode M) is present for the file. If inode M is present, then the access request is serviced from tier 2 storage array 360. If an inode does not exist in the file set for the highest ranking tier, then a similar check is made for an inode for the file system for the next highest ranking tier (e.g., tier 1 storage array 350), and so on through the hierarchy of file sets/tiers until an inode for the file is found, at which point the access request is serviced from the tier corresponding to that inode.

However, as described above, a flag can be set in each inode to indicate the presence of a related inode in another file set (e.g., if the inodes have the same inode number), or each inode can include reference to a related inode in another file set (e.g., if the inodes have different inode numbers). Such information can be used to facilitate servicing a request to access a file. For example, if a request to access a file is directed to a one of the file sets, and the inode for the file in that file set indicates that another inode exists for that file, then the request can be directed to the next highest (or next lowest) tier in the tier hierarchy, depending on which tier is currently being accessed and the access policy in place.

In block 418, the state information S can be used to identify files that are candidates for movement from one tier to another tier. The state information for a file can be checked each time the file is accessed. Also, the state information for a file, and for all files in each file set, can be checked on a periodic basis. In an embodiment in which the state information is included in each inode, the check can be efficiently performed by querying the state information for (e.g., in) each inode in each file set to identify cold files and hot files.

In addition, state information S for files in a tier can be checked if the available space in a tier falls below a threshold value. For example, if a higher ranking tier (which generally has less capacity then the lower ranking tiers) begins to get full, it may be necessary to evict (move) files or blocks from the higher tier to a lower tier, in order to make space in the higher tier for new (e.g., hot) data. By having a separate set of inodes for the higher tier, it is more efficient to scan just that set of inodes to determine which files or blocks can be evicted.

Thus, embodiments according to the present disclosure provide an efficient mechanism for identifying infrequently accessed files that can be moved to a lower tier, and also for identifying frequently accessed files that can be moved to a higher tier. Furthermore, as described above, embodiments according to the present disclosure provide an efficient mechanism for accomplishing the movement of files and for servicing accesses to those files after they have been moved.

The efficiencies associated with the use of multiple inodes, file sets, etc., can be further improved by combining a write to a file with movement of the file to a higher tier. In other words, if a file is being written to, an assumption can be made that the file will be frequently accessed from that point forward. Accordingly, in response to a write request, the file's extents can be moved to the higher tier as described above, and the write operation is then performed to the blocks in the higher tier. The assumption of frequent access can be confirmed by monitoring state information S for the file.

Figure 8:
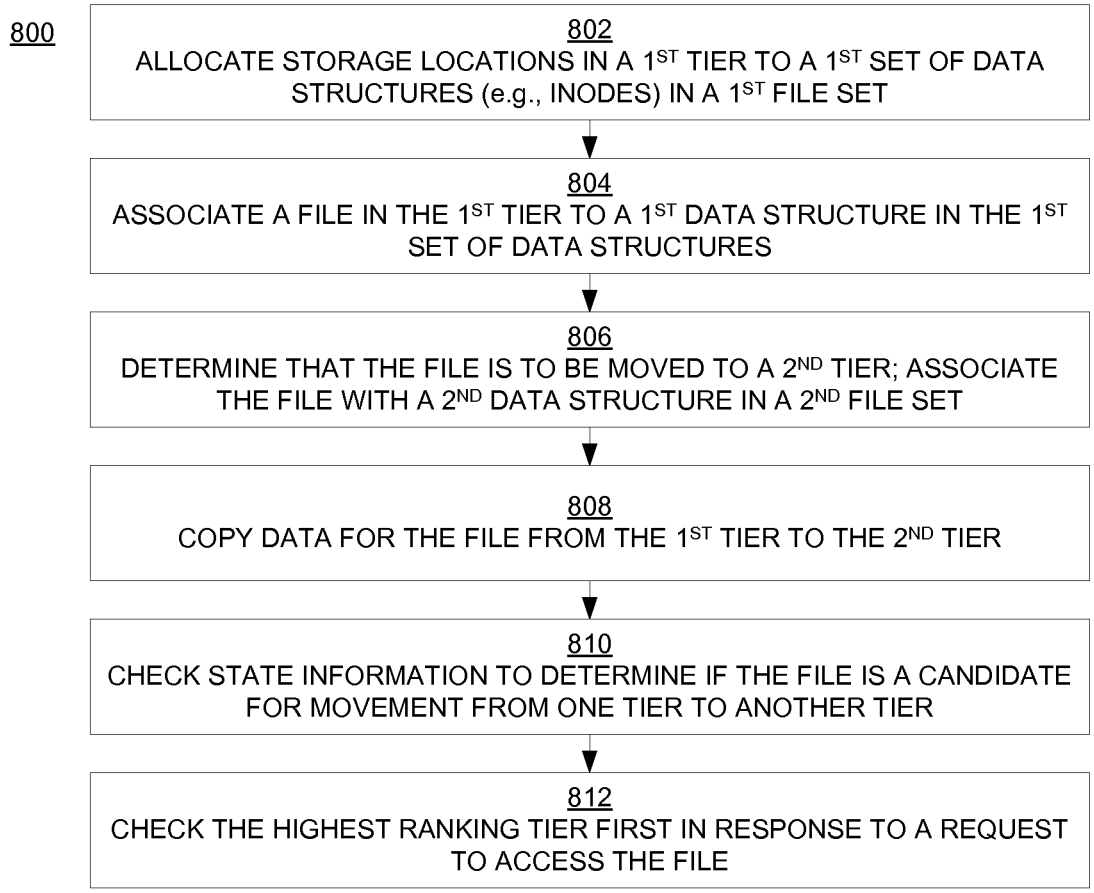
FIG. 8 is a flowchart of an example of a computer-implemented method for managing files in a multi-tier storage system according to embodiments of the disclosure.

FIG. 8 is a flowchart 800 of an example of computer-implemented processes for managing files in a multi-tier storage system according to embodiments of the present disclosure. Flowchart 800 can be implemented as computer-executable instructions residing on some form of computer-readable storage medium (e.g., using computing system 110 of FIG. 1).

In block 802 of FIG. 8, storage locations in a first tier of a multi-tier storage system are allocated to a first set of data structures (e.g., inodes) in a first file set.

In block 804, a file that is stored in the first tier is associated with a first data structure of the first set of data structures.

In block 806, in response to determining that data in the file is to be moved to a second tier of the multi-tier storage system, the file is associated with a second data structure in a second file set so that two data structures are associated with the file, where the second data structure is allocated a storage location in the second tier.

In one embodiment, the first data structure and the second data structure have identical numbers (e.g., the same inode numbers). In another embodiment, the first data structure and the second data structure have different numbers (e.g., different inode numbers).

In one embodiment, a flag associated with the first data structure is set to indicate presence of the second data structure. In another embodiment, reference to the second data structure is included in the first data structure.

In block 808, data for the file is copied from the first tier to the storage location in the second tier.

In block 810, state information associated with the file is checked to determine whether the file is a candidate for movement from one tier of the multi-tier storage system to another tier of the multi-tier storage system. In one embodiment, the check is performed in response to an access to the file. In another embodiment, the check is performed in response to expiration of a specified time period (e.g., at periodic intervals). In one embodiment, the state information associated with the first data structure is checked if the file is in the first tier, and the state information associated with the second data structure is checked if the file is stored in the second tier.

In block 812, in response to a request to access the file, the higher ranking tier is checked for a data structure associated with the file before the lower ranking tier is checked.

The embodiments described above can be readily generalized to storage systems having more than two tiers. The embodiments described above can also be extended to implementations in which a higher performance tier—specifically, an SSD—is used for caching data. That is, in an embodiment in which a higher ranking tier is implemented using an SSD and a lower ranking tier is implemented using an HDD, data can be cached on the SSD as well as stored on the HDD. For example, with reference to FIG. 3, tier 1 storage array 350 can be implemented as an HDD, and tier 2 storage array 360 can be implemented as an SSD.

Figure 9:
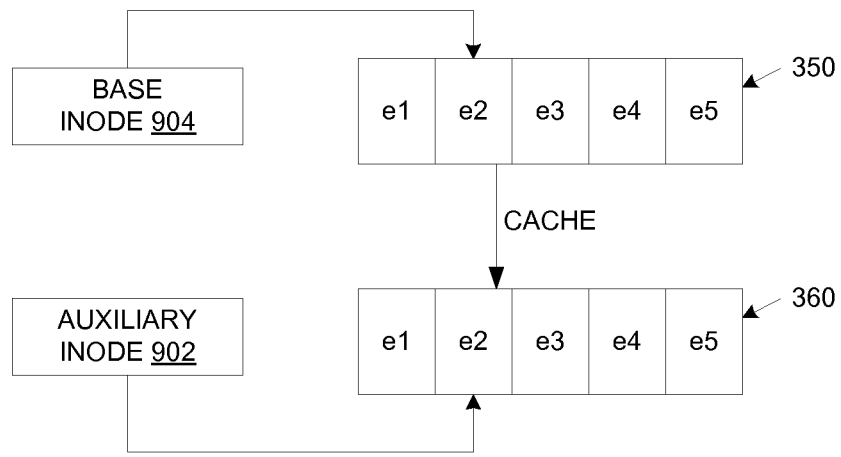
FIG. 9 illustrates data caching using multiple inodes according to embodiments of the disclosure.

In such an embodiment, with reference to FIG. 9, an auxiliary data structure (e.g., inode 902) is used to keep track of the cached data regions. (As above, by way of example, the example of FIG. 9 is presented using the term "inode," but it is understood that embodiments of the disclosure are not limited to data structures known as inodes.) File system data and metadata resides in the HDD volume, and the file system is given control of the SSD volume.

In the example of FIG. 9, to populate the cache (tier 2 storage array 360), when some region of a file needs to be cached, a region is allocated from the SSD volume and allocated to auxiliary inode 902 (analogous to second inode M described previously herein). Auxiliary inode 902 is created if not already present. There will be extent descriptor(s) in the auxiliary inode's block map that point to the allocated region in the SSD volume. The SSD volume is populated by data fetched from the appropriate location in the HDD volume by going through a base data structure (e.g., base inode 904, analogous to first inode N described previously herein). Base 904 inode can be queried to determine whether auxiliary inode 902 exists, as previously described herein.

To read from the cache (SSD; e.g., tier 2 storage array 360), when a read request comes to base inode 904, the base inode is queried to determine whether auxiliary inode 902 exists. If auxiliary inode 902 exists, then the auxiliary inode is read to determine if a cached region exists. If the cached region exists, then data is read from the cached region on the SSD volume; otherwise, data is read through base inode 904 from the HDD volume.

To write to the cache (SSD; e.g., tier 2 storage array 360), different write caching policies may be followed, namely: write-through, write-behind, and cache invalidation (write-around). In write-through, the regions to be written to on both the SSD volume and the HDD volume are located, and new data is written to both locations. If necessary, regions can be allocated to auxiliary inode 902, base inode 904, or both inodes. In write-behind, the region to be written to on the SSD volume is located, new data is written to that region, and the region is marked "dirty" so that it can be flushed to the HDD volume eventually. In write-around, the region on the SSD volume is located and deallocated, the region on the HDD volume is located, and data is written to that region.

There are different ways to invalidate the cache (e.g., SSD). The state information described previously herein can be utilized to identify cache regions that are candidates for invalidation. For example, the list of auxiliary inodes is traversed, and some inodes or some regions to invalidate are chosen for invalidation based on their I/O temperature as determined from the state information. Then, specific blocks from the SSD volume are invalidated, and then the corresponding regions on the respective auxiliary inodes are invalidated. Ultimately, cache invalidation recovers the blocks on the SSD volume as well as removes extent descriptors from auxiliary inodes (and even may remove the auxiliary inodes themselves).

Figure 10:
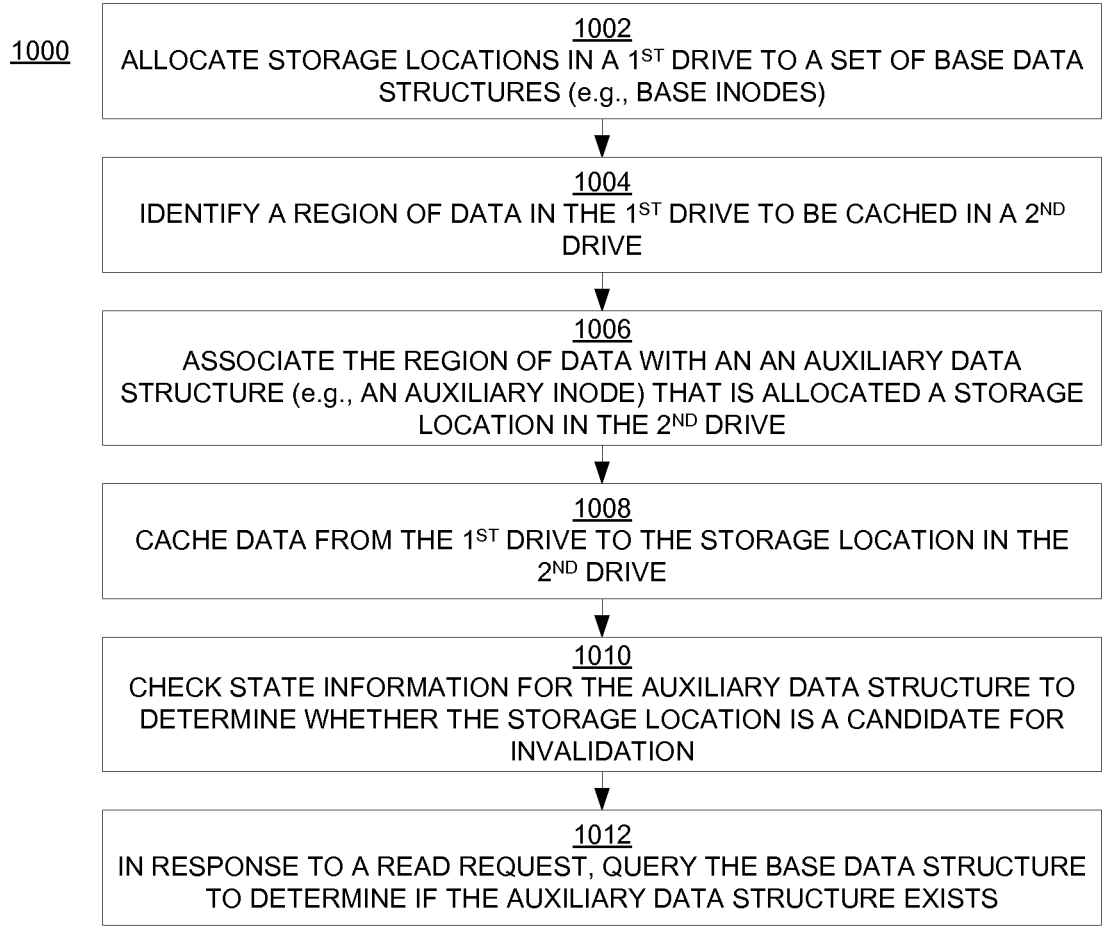
FIG. 10 is a flowchart of an example of a computer-implemented method for caching data according to embodiments of the disclosure.

FIG. 10 is a flowchart 1000 of an example of computer-implemented processes for managing files in a multi-tier storage system according to embodiments of the present disclosure. Flowchart 1000 can be implemented as computer-executable instructions residing on some form of computer-readable storage medium (e.g., using computing system 110 of FIG. 1).

In block 1002, storage locations in a first drive of a multi-drive storage system are allocated to a set of base data structures (e.g., base inodes). In one embodiment, the first drive is an HDD.

In block 1004, a region of data in the first drive to be cached in a second drive of the multi-drive storage system is identified, where the region is associated with a base data structure of the set of base data structures. In one embodiment, the second drive is an SSD.

In block 1006, the region of data to be cached is associated with an auxiliary data structure (e.g., an auxiliary inode) that is allocated a storage location in the second drive of the multi-drive storage system so that both the base data structure and the auxiliary data structure are associated with the region of data.

In one embodiment, the base data structure and the auxiliary data structure have identical numbers (e.g., the same inode numbers), in which case a flag associated with the base data structure can be set to indicate presence of the auxiliary data structure. In another embodiment, the base data structure and the auxiliary data structure have different numbers (e.g., different inode numbers), where the base data structure includes reference to the auxiliary data structure.

In block 1008, the data from the first drive is cached in the storage location in the second drive.

In block 1010, state information associated with the auxiliary data structure is checked to determine whether the storage location in the second drive is a candidate for cache invalidation.

In block 1012, in response to a read request for the data, the base data structure is queried to determine whether the auxiliary data structure exists, in which case the auxiliary data structure is used to read the data from the storage location in the second drive.

Thus, according to the embodiments described in conjunction with FIGS. 9 and 10, file system performance can be boosted by using an SSD as a caching device. Cached data maps of a file are managed by both an auxiliary data structure (e.g., an auxiliary inode) and a base data structure (e.g., a base inode). Caching at the file level means that caching decisions can be made efficiently (e.g., at the inode level) by checking I/O temperatures of inodes, for example. Identifying "hot" files or extents is efficient as a separate data element in an auxiliary data structure (e.g., an auxiliary inode) is available to store state information. Furthermore, file level caching (e.g., caching at the logical level) is beneficial relative to physical level caching, because file level caching is not perturbed by transformations below the logic level, such as deduplication, compression, and/or encryption.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:
   allocating storage locations in a first tier of a multi-tier storage system to a first plurality of data structures in a first file set, wherein said first tier includes a hard disk device and each of said data structures comprises information about a respective file and maps a file to memory block addresses;
   associating a file that is stored in said first tier with a first inode data structure of said first plurality of data structures;
   in response to a determination that data in said file is to be moved to a solid state device of a second tier of said multi-tier storage system to evict said data in order to make space for new data, associating said file with a second inode data structure in a second file set such that two data structures are associated with said file, wherein said second data structure is allocated a storage location in said second tier;
   copying said data from said first tier to said storage location in said second tier based at least in part on a higher I/O performance of said second tier;
   wherein the determination is based on scanning state information associated with said file that is checked to determine whether or not said file is a candidate for movement from one tier of said multi-tier storage system to another tier of said multi-tier storage system, wherein the checking includes:
   checking state information associated with said first inode data structure if said file is stored in said first tier; and
   checking state information associated with said second inode data structure if said file is stored in said second tier;
   wherein said first tier, using the hard disk device, is utilized to store file system data and said second tier is utilized to perform file level caching, using the solid state device, at a logical level.

2. The non-transitory computer-readable storage medium of claim 1 wherein said first data structure and said second data structure are identified using identical identifiers.

3. The non-transitory computer-readable storage medium of claim 1 wherein said first data structure and said second data structure have different identifiers.

4. The non-transitory computer-readable storage medium of claim 1 wherein said method further comprises setting a flag associated with said first data structure to indicate presence of said second data structure.

5. The non-transitory computer-readable storage medium of claim 1 wherein said method further comprises including reference to said second data structure in said first data structure.

6. The non-transitory computer-readable storage medium of claim 1 wherein said checking is performed in response to an event selected from the group consisting of: an access to said file; and expiration of a specified time period.

7. The non-transitory computer-readable storage medium of claim 1 wherein one of said first and second tiers comprises a higher ranking tier relative to the other of said first and second tiers, wherein said method further comprises, in response to a request to access said file, checking said higher ranking tier for a data structure associated with said file before checking the lower ranking tier.

8. The non-transitory computer-readable storage medium of claim 1 wherein one of said first and second tiers comprises a higher ranking tier relative to the other of said first and second tiers, wherein said method further comprises, in response to determining that available storage capacity of said higher ranking tier is below a threshold value, checking state information only for data structures for said higher ranking tier to identify files that are candidates to be moved to the lower ranking tier.

9. The non-transitory computer-readable storage medium of claim 1, wherein allocated blocks of data from different tiers are allocated exclusively to respective sets of inodes.

10. A computer system comprising:
a processor; and
memory coupled to said processor and having stored therein instructions that, if executed by said computer system, cause said computer system to execute operations comprising:
a multi-tier storage having a first tier of storage and a second tier of storage, wherein storage locations in said first tier are allocated to a first plurality of inodes in a first file set and wherein said file is associated with a first inode of said first plurality of inodes;
associating said file with a second inode of a second plurality of inodes in a second file set such that two inodes are associated with said file, wherein said second plurality of inodes is allocated storage locations in said second tier and said first tier has first state information and said second tier has second state information;
scanning state information in the first tier;
determining that data in a file is to be moved from the first tier of the multi-tier storage system to the second tier of said multi-tier storage system to evict said data in order to make space for new data based on state information associated with said file, the determining including checking to determine whether or not said file is a candidate for movement from one tier of said multi-tier storage system to another tier of said multi-tier storage system,
wherein the checking includes:
checking state information associated with said first inode if said file is stored in said first tier; and
checking state information associated with said second inode if said file is stored in said second tier;
wherein said first tier, using the hard disk device, is utilized to store file system data and said second tier is utilized to perform file level caching, using the solid state device, at a logical level.

11. The computer system of claim 10 wherein said first inode and said second inode have identical inode numbers, and wherein said operations further comprise setting a flag associated with said first inode to indicate presence of said second inode.

12. The computer system of claim 10 wherein said first inode and said second inode have different inode numbers, and wherein said first inode includes reference to said second inode.

13. The computer system of claim 10 wherein said checking is performed in response to an event selected from the group consisting of: an access to said file; expiration of a specified time period; and available storage capacity in a tier falling below a threshold value.

14. The system of claim 10, wherein allocated blocks of data from different tiers are allocated exclusively to respective sets of inodes.

15. A computer-implemented method comprising:
allocating storage locations in a first drive of a multi-drive storage system to a plurality of base data inode structures, wherein said first drive includes a hard disk device and each of said base data inode structures comprises information about a respective region of data and maps a region of data to memory block addresses, each individual base data inode structure identifying an auxiliary inode data structure in a second drive, wherein said second drive include a solid state drive;
identifying a region of data in said first drive to be cached to evict said region of data in order to make space for new data, wherein said region is associated with a base data inode structure of said plurality of base data inode structures;
associating said region of data with an auxiliary inode data structure that is allocated a storage location in a solid state device of second drive such that said base data structure and said auxiliary inode data structure are associated with said region of data;
caching said data from said first drive, at a file level, in said storage location in said second drive;
wherein the identifying is based on state information associated with said auxiliary inode data structure that is checked to determine whether said storage location in said second drive is a candidate for cache invalidation, wherein the checking includes:
checking state information associated with said base inode data structure if said region of data is stored in said second drive; and
checking state information associated with said auxiliary inode data structure if said region of data is stored in said second drive.

16. The method of claim 15 wherein said base data structure and said auxiliary data structure have identical identifiers, and wherein said method further comprises setting a flag associated with said base data structure to indicate presence of said auxiliary data structure.

17. The method of claim 15 wherein said base data structure and said auxiliary data structure have different identifiers, and wherein said base data structure includes reference to said auxiliary data structure.

18. The method of claim 15, wherein allocated blocks of data from different tiers are allocated exclusively to respective sets of inodes.

* * * * *